June 26, 1951 M. DEN OUTER 2,558,546

ALPHABETIC INDEX SYSTEM WITH REGISTRY ELEMENTS HAVING CHECKING MARKS OBTAINED BY PUNCHING

Filed March 22, 1948

Inventor
M. Den Outer
BY
Glascock Downing & Seebold
Attys.

Patented June 26, 1951 2,558,546

UNITED STATES PATENT OFFICE 2,558,546

ALPHABETIC INDEX SYSTEM WITH REGISTRY ELEMENTS HAVING CHECKING MARKS OBTAINED BY PUNCHING

Marius den Outer, Rotterdam, Netherlands

Application March 22, 1948, Serial No. 16,358
In the Netherlands March 27, 1947

6 Claims. (Cl. 129—16.5)

This invention relates to an alphabetic index system or card registry of the kind referred to in my co-pending U. S. patent application, Serial No. 742,157 filed April 17, 1947, in which a plurality of registry elements are arranged in horizontally stepped relation, each of the said registry elements having its lateral uncovered part provided with consecutive horizontal spaces successively designated by the characters of the alphabet, so as to enable some of the said horizontal spaces to be marked according to the initial characters of the headings of the registry elements, in order to obtain simple and effective means to check the exact position of the registry elements in accordance with the alphabetic succession of their headings.

An object of the present invention is to improve the index systems of the above mentioned kind and to execute the registry elements thereof in such a manner that the marking of the horizontal spaces on the visible borders of the registry elements is greatly facilitated and can be realised by a simple punching operation.

Another object of the invention is to provide the registry elements with means which enable in an easy and rapid way to ascertain, whether some registry elements have been misplaced in the registry by putting them straight behind each other, instead of in overlapping relation. Errors of this kind cannot be detected in the card index according to my above said patent application, since in case of "double-placed" cards the lateral border with the marked horizontal spaces of the lower card will be invisible.

According to the present invention each of the registry elements is provided, adjacent to its lateral uncovered part, with a colored area which is covered by the next superposed element, so that, when the registry elements are punched in some of the horizontal spaces on the said lateral part according to the initial characters of the headings of the elements, clearly visible marks will appear on the punched spots, due to the fact that the colored area of the underlying element becomes visible through the punching apertures. Double-placing of the elements will now be detected immediately, since in this case the punching holes in the upper element are situated above the uncolored lateral part of the lower element, so that no colored checking marks will appear on the uncovered part of the upper element.

Further objects, features and details of my invention will become evident from the following description with reference to the accompanying drawings, in which.

Figure 2:
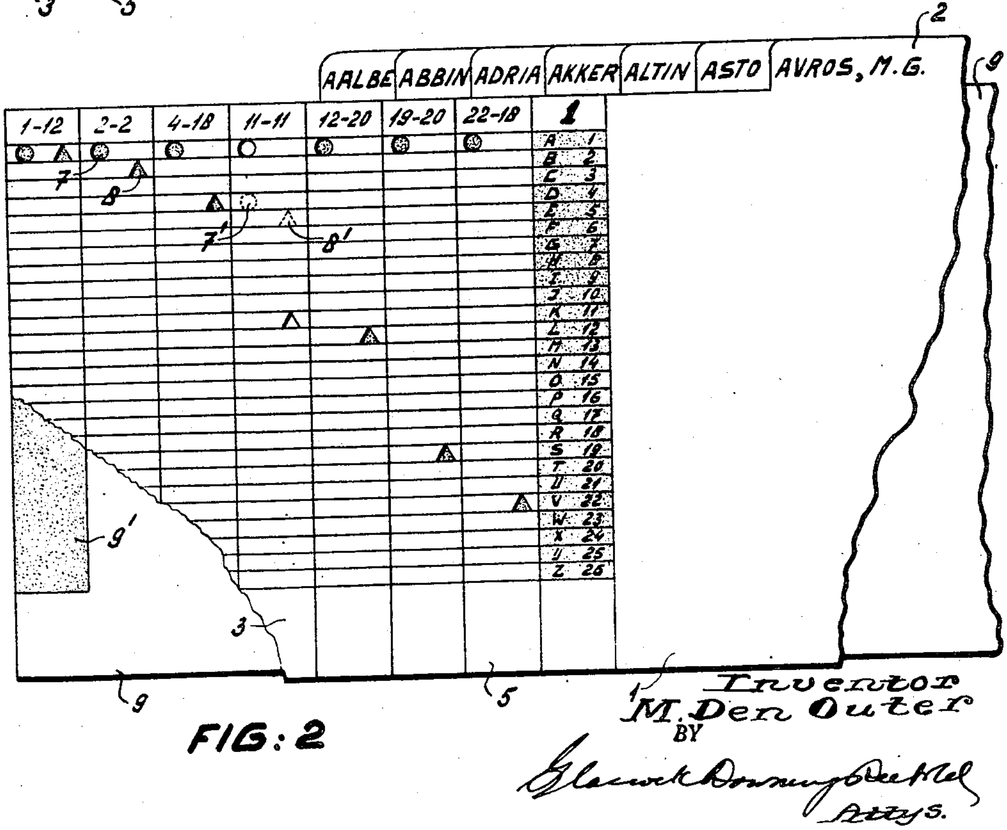
Fig. 2 is a similar view showing, on a smaller scale, a row or echelon of overlapping cards, when placed in the card registry.

In the drawings the cards 1 are provided with horizontal tabs 2, in the manner as described in my co-pending U. S. patent applications Serial No. 742,156 and No. 742,157 both of which were filed on April 17, 1947. These tabs 2 are intended to bear the heading of the card. As appears from Fig. 2, the cards are positioned in the card box or card registry in such a manner that they laterally overlap each other and only the lateral parts (left hand parts, when the cards are placed from the left to the right) of the card bodies and of the tabs are visible, except the uppermost (extreme right) card in a row, which is entirely visible. In Fig. 2 a single row or echelon of cards is shown, but it will be evident that the card register comprises a plurality of such rows placed behind each other. The number of overlapping cards in each row may be varied at will.

The visible lateral border of each card has been designated by the numeral 3. This lateral border 3 is provided with a plurality of spaced horizontal lines which form 26 horizontal spaces 4 (see Fig. 1) so as to correspond with the number of characters of the alphabet.

Adjacent to the said lateral border 3, each card is provided with a column 5 of substantially the same width as the border 3. At least over the same height as the total height of the spaces 4 the column 5 is colored with a strong, bright color (indicated in the drawing by an oblique hatching). Furthermore the column 5 contains the characters of the alphabet and the ordinal numbers thereof, so as to enable to ascertain quickly and easily to which definite character of the alphabet each of the horizontal spaces 4 belongs. The characters and ordinal numbers are placed on the colored part of the column 5.

Figure 1:
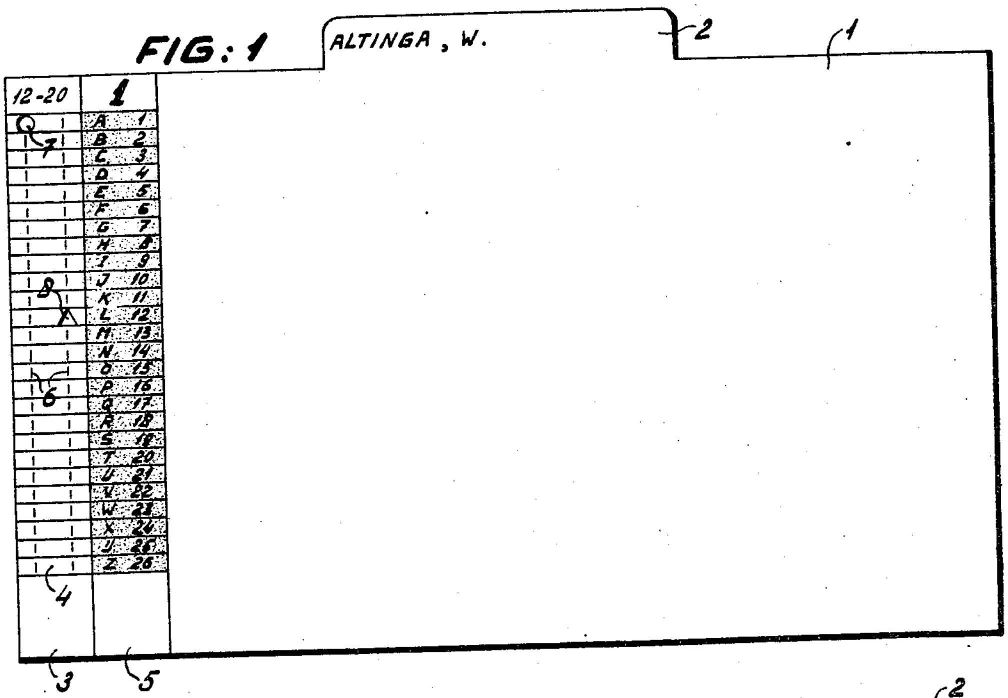
Fig. 1 shows a card of a card index according to the present invention in front view.

The card 1 shown in Fig. 1 bears the heading: "Altinga, W" on the tab 2. The top of the column 5 bears the indication "1," since the first letter of the heading (A) is the first character of the alphabet. The top of the lateral border 3 bears the indication "12–20," which means that the second letter of the heading corresponds with the twelfth and the third letter with the twentieth character of the alphabet. The said number-indication greatly facilitates the correct placing of the cards in the card registry.

The visible border 3 (see Fig. 1) may be provided with a number of vertical lines 6, serving as indications where the marking apertures have to be punched in the card. Upon the first line 6 a circular hole 7 and upon the second line 6 a triangular hole 8 has been formed by punching. The punching hole 7 has been applied in the first horizontal space 4 which corresponds with the character A, this being the first letter of the heading "Altinga," whereas the hole 8 has been formed in the twelfth horizontal space 4 corresponding with the character L, this being the second letter of the heading.

In Fig. 2 seven cards have been arranged in horizontally stepped relation. Since all the headings of these cards have the character A as the first letter, all punching holes 7 are in the first horizontal space 4. The punching holes 8 of the cards correspond with the second letter of the card headings.

Since the cards overlap each other, the lateral visible border 3 of each card comes to lie upon the colored column 5 of the preceding card. In consequence thereof the color of the covered columns 5 will be visible through the punching holes 7 and 8, so that the alphabetic sequence of the cards is distinctly marked. From the marks 7 lying in a horizontal row and from the marks 8 which are regularly stepped in downward direction, it is immediately apparent that the cards are placed in correct alphabetic succession. This may be also concluded from the number-indications 1–12, 2–2, 4–18, etc. at the tops of the visible lateral borders 3.

However, in the fourth visible border 3 counting from the left (see Fig. 2) the punching holes are uncolored. This is an indication that on that spot cards have been "double-placed." It has been assumed that behind the fourth card with the heading "Akker" another card with the heading "Dekker" has been misplaced. The punching holes 7′ and 8′ of the last mentioned card have been indicated by dotted lines and correspond with the first two letters "De" of the heading of this card. Since the lateral border 3 of the card "Akker" now lies upon the uncolored border 3 of the card "Dekker," it will be evident that the punching holes in the card "Akker" remain uncolored.

If, instead of a card "Dekker," a card "Aersen" had been placed behind the card "Akker," the punching hole 7 would of course appear as a colored mark, since in this case the holes 7 and 7′ would register with each other, so that the color of the column 5 belonging to the third card "Adriaan" would be visible through the coinciding holes. However, in this case the double-placing of a card behind the card "Akker" would be detected by the punching hole 8 which would still remain uncolored.

Only, when behind the card "Akker," a card has been placed, the heading of which has its first and its second letter identical to those of the card "Akker," such as for example a card "Akro," this double-placing would not be immediately detected. Of course such instances occur very seldom, but even then, assuming that the card "Akro" could not be found and there would be no uncolored marks throughout the whole card registry, one might conclude that double-placing of this card could be possible only in the neighborhood of the cards of which the heading begins with "Ak." At any rate the time taken in the search for the missing card will be greatly reduced. When, at least the holes for the second initial character are punched not exactly upon the second line 6, but when these punching holes are punched on variable spots in the proximity of the said line, it is, moreover, still possible to detect double-placing also in such cases, since there is a great chance that the punching holes 8 will not exactly coincide.

The first card of a row or an echelon of cards in the card registry, such as for example the card "Aalberse" in Fig. 2, would have no colored underground for its punching holes, since the visible border 3 of this card does not lie upon a column 5 of another card. In order to permit also the punching holes of these first cards to appear as colored marks, a single- or double-colored column 9′ may be provided along the left hand edge of the separating card 9 by which two consecutive card rows are separated from each other. These separating cards 9 have the same width as the card box and their upper edge is at the same level as the upper edges of the bodies of the cards, so that the tabs of the cards extend beyond the said upper edge of the separating cards.

It is to be understood that my invention is not limited to the described and illustrated embodiment, for it is evident that details may be varied and equivalents may be used for the various parts of the card registry, without departing from the spirit of my invention or the scope of my claims.

What I claim is:

1. An alphabetic vertical index system comprising a plurality of groups of index elements provided with headings to identify the individual elements, the elements of each group being arranged in laterally offset relation and in alphabetical order of their headings, each element having its lateral uncovered part provided with spaced horizontal lines, the interspaces of which being successively designated by the letters of the alphabet, and, adjacent to the said lateral uncovered part, a colored area covered by the next element in the group, some of the said interspaces in the lateral uncovered part of each element being provided with punched holes, so as to partly uncover the underlying colored area and thus to form marks according to the initials of the heading of the element in question.

2. An alphabetic vertical card index comprising a plurality of groups of index cards provided with headings to identify the individual cards, the cards of each group being arranged in laterally offset relation and in alphabetical order of the card headings, each card having its visible lateral border provided with consecutive horizontal lines which form spaces successively designated by the letters of the alphabet and, adjacent to the said visible lateral border, a colored area covered by the visible lateral border of the next card in the group, the cards being punched in some of the spaces between the horizontal lines on their visible lateral borders, so as to show colored marks in the said spaces corresponding to the initial letters of the card headings.

3. An alphabetic vertical card index as defined in claim 2, wherein the visible lateral border of each card is provided with at least two spaced vertical lines and with a punched hole of different configuration on each of the said lines, so as to show colored marks of different configuration corresponding to consecutive initial letters of the card heading.

4. An alphabetic vertical card index as defined in claim 2, wherein the separating members between the groups of cards are provided along their lateral edges with a similar colored area, so as to show colored marks in the visible lateral border of the first card in each group of cards.

5. A card for an alphabetical vertical card index, having a lateral border provided with consecutive horizontal lines which form spaces successively designated by the letters of the alphabet and a colored vertical area of substantially the same width adjoining the said lateral border, the spaces in said lateral border being adapted to be punched with holes according to the initials of the heading of the card so that when the card is arranged with other like cards in laterally offset relation and in alphabetical order of their headings the holes in the card partly uncover the colored area of the underlying card to form marks according to the initials of the heading.

6. A card for an alphabetical vertical card index as defined in claim 4, wherein the horizontal lines on the lateral border of the card are crossed by at least two spaced vertical lines.

MARIUS DEN OUTER.

REFERENCES CITED

The following references are of record in the file of this patent:

UNITED STATES PATENTS

| Number | Name | Date |
|---|---|---|
| 2,261,861 | Smith | Nov. 4, 1941 |

FOREIGN PATENTS

| Number | Country | Date |
|---|---|---|
| 486,328 | Germany | Nov. 15, 1929 |
| 120,681 | Austria | Jan. 10, 1931 |
| 647,413 | Germany | July 3, 1937 |